(12) United States Patent
Choe

(10) Patent No.: US 11,299,352 B2
(45) Date of Patent: Apr. 12, 2022

(54) AUTOMATIC CART TRANSPORT SYSTEM

(71) Applicant: KOREA WHEEL CORPORATION, Boryeong-si (KR)

(72) Inventor: Hun Choe, Boryeong-si (KR)

(73) Assignee: KOREA WHEEL CORPORATION, Boryeong-si (KR)

( * ) Notice: Subject to any disclaimer, the term of this patent is extended or adjusted under 35 U.S.C. 154(b) by 0 days.

(21) Appl. No.: 17/149,131

(22) Filed: Jan. 14, 2021

(65) Prior Publication Data

US 2021/0147154 A1 May 20, 2021

Related U.S. Application Data

(63) Continuation-in-part of application No. 17/105,227, filed on Nov. 25, 2020, which is a continuation of
(Continued)

(30) Foreign Application Priority Data

Sep. 12, 2018 (KR) .................. 10-2018-0109014
Jun. 7, 2019 (KR) .................. 10-2019-0067522

(51) Int. Cl.
  *B65G 39/20* (2006.01)
  *B65G 35/06* (2006.01)
  (Continued)

(52) U.S. Cl.
  CPC .......... *B65G 35/06* (2013.01); *B65G 17/005* (2013.01); *B65G 17/34* (2013.01)

(58) Field of Classification Search
  CPC ......... B65G 17/34; B65G 35/06; B65G 39/20
  (Continued)

(56) References Cited

U.S. PATENT DOCUMENTS 2,710,319 A * 6/1955 Bush ................... E01B 25/22
                                                                200/61.44
3,074,356 A   1/1963 Parker et al.
(Continued)

FOREIGN PATENT DOCUMENTS

GB     1076820 A    7/1967
KR   10-0490674    5/2005
(Continued)

OTHER PUBLICATIONS

International Search Report, PCT/KR2019/008581, dated Oct. 18, 2019 (4 pages).

*Primary Examiner* — Douglas A Hess
(74) *Attorney, Agent, or Firm* — R. Reams Goodloe, Jr.

(57) ABSTRACT

An automatic cart transport system. A track located in a factory working floor provides a trackway for an endless flexible conveyor chain. A plurality of chain units including a first chain portion having vertical rollers and a second chain portion having horizontal rollers are flexibly coupled, and the chain is advanced along the trackway by a drive motor. The chain units support thereabove, but within the track, a coupling plate having therein an aperture for accepting and capturing a chain connection shaft which is detachably connected to a cart. The cart is automatically towed along a defined pathway on the working floor of a factory by the chain, when connected to the coupling plate on the endless flexible conveyor chain.

8 Claims, 5 Drawing Sheets

Related U.S. Application Data application No. PCT/KR2019/008581, filed on Jul. 11, 2019.

(51) Int. Cl.
  *B65G 17/34* (2006.01)
  *B65G 17/00* (2006.01)

(58) Field of Classification Search
  USPC .................................. 198/465.1; 104/172.5
  See application file for complete search history.

(56) References Cited

U.S. PATENT DOCUMENTS

| | | | |
|---|---|---|---|
| 3,589,503 A * | 6/1971 | Leach | B65G 17/385 |
| | | | 198/683 |
| 3,590,745 A | 7/1971 | Ouska | |
| 3,762,535 A | 10/1973 | Becker et al. | |
| 3,774,548 A * | 11/1973 | Borst | B61L 23/002 |
| | | | 105/30 |
| 4,598,812 A | 7/1986 | Grube | |
| 4,715,288 A * | 12/1987 | Catena | B61C 13/04 |
| | | | 104/95 |
| 4,716,839 A * | 1/1988 | Catena | B61B 13/04 |
| | | | 105/153 |
| 5,074,220 A * | 12/1991 | Petersen | B61B 13/04 |
| | | | 104/93 |
| 6,125,991 A | 10/2000 | Veldkamp et al. | |
| 6,386,355 B1 | 5/2002 | Willems | |
| 6,450,326 B1 * | 9/2002 | Hoffmann | B65G 17/20 |
| | | | 104/172.5 |
| 6,910,425 B2 | 6/2005 | Galpin | |
| 10,017,327 B2 * | 7/2018 | Okamura | B61B 10/00 |
| 10,280,005 B2 * | 5/2019 | Stauber | B65G 17/32 |
| 10,550,881 B2 * | 2/2020 | Lavigno, IV | F16C 19/10 |
| 10,676,283 B2 * | 6/2020 | Gumbel | B65G 69/20 |
| 11,046,526 B1 * | 6/2021 | Hyvarinen | F16C 19/14 |
| 2004/0084288 A1 | 5/2004 | Ashida et al. | |
| 2013/0284569 A1 | 10/2013 | Studer | |
| 2021/0127596 A1 | 5/2021 | Kim | |
| 2021/0127597 A1 | 5/2021 | Choe | |
| 2021/0130102 A1 | 5/2021 | Kim | |

FOREIGN PATENT DOCUMENTS

| | | |
|---|---|---|
| KR | 10-2009-0088668 | 8/2009 |
| KR | 10-1150368 | 6/2012 |
| KR | 10-2012-0094769 | 8/2012 |
| KR | 10-2012-0094769 A | 8/2012 |
| KR | 10-2012-0125064 | 11/2012 |
| KR | 10-2012-0125064 A | 11/2012 |
| KR | 10-1292779 B1 | 8/2013 |
| KR | 10-2017-0025460 | 3/2017 |
| KR | 10-2018-0020542 | 2/2018 |
| KR | 10-2018-0020542 A | 2/2018 |
| KR | 10-2053997 | 12/2019 |
| KR | 10-2053997 B1 | 12/2019 |
| KR | 10-2066005 | 1/2020 |
| KR | 10-2066005 B1 | 1/2020 |
| KR | 10-2074300 | 3/2020 |
| KR | 10-2074300 B1 | 3/2020 |
| WO | WO 2020/054958 A1 | 3/2020 |

* cited by examiner

AUTOMATIC CART TRANSPORT SYSTEM

RELATED PATENT APPLICATIONS

This application is a continuation-in-part of U.S. Non-Provisional patent application Ser. No. 17/105,227, filed Nov. 25, 2020, entitled PLANT CULTIVATION SYSTEM USING TROLLEY CONVEYOR, the contents of which are incorporated herein in its entirety, including the specification, drawing, and claims, by this reference. That application was a continuation of PCT/KR2019/008581, filed Jul. 11, 2019, and published as WIPO Publication No. WO 2020/054958 A1 on Mar. 19, 2020, entitled Trolley Conveyor and Plant Cultivation System Using Same. That PCT application claimed priority from Korean Patent Application 10-2018-0109014, filed Sep. 12, 2018, and Korean Patent Application 10-2019-0067522, filed Jun. 7, 2019.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever

TECHNICAL FIELD

The present invention relates to a conveyor type cart transport system, and more particularly, to an automatic cart transport system for transferring a cart loaded with goods along a predetermined path along a factory floor.

BACKGROUND

In factories, various types of carts are used, especially for the transport of cargo after loading. Optimized usage of carts is one of the basic strategies for improving and reducing costs of material handling. There are many varieties of carts available, and of course, carts may be customized or fabricated in-house to meet the needs in a particular industrial setting. Carts may be selected for adequacy of load carrying capabilities, easy of rolling under load, adequacy of clearance along selected pathways, and the type of handle selected. As used herein, a cart without a handle, sometimes called a dolly, may also be used for transport of goods in a factory. However, it may be preferred to provide a cart having a handle, so that goods can be moved while on the cart by manual application of force to the handle on the cart.

However, when a large amount of cargo is loaded on a cart, it may take a lot of effort for an operator to manually move the cart. Also, in order to ship an article that has been manufactured in a factory, an operator may need to repeatedly load and offload an article to or from a cart. This process requires a lot of manpower, and it may take a considerable amount of time to move articles around a factory, to get them to a freight vehicle for loading.

Consequently, there remains a continuing and unmet need for an automated system which may be easily installed in a factory, for use in the automated transfer of carts which are loaded with articles that may be in work or that may be completed and thus await shipping. It would be advantageous if carts were easily connectable to, and detachable from, the automated system, so that transfer can be easily started and stopped, as appropriate for given goods. It would be advantageous if the weight of the articles for transport were easily supported on the cart. It would also be advantageous that the cart include a handle for easy manual movement when the cart is not attached to the automatic conveyor system, without resort to power tools or moving devices.

SOME OBJECTS, ADVANTAGES, AND NOVEL FEATURES

An objective of the invention(s) disclosed herein is to provide a design for an automatic cart transport system in a factory, which is easy to install, and which avoids the necessity of excessive manual labor, or independent power tools or powered moving devices of various sorts.

It is another important objective to provide a quickly attachment and detachment mechanism so that a cart may be easily and quickly attached to, and removed from, an automatic conveyor system Finally, another important objective is to provide an automatic conveyor system for use in a factory that has wear resistant components included in the design, so that the system is of long life when installed for operation in a track located in a substrate such as in a factory working floor.

The above objects and various advantages of the present invention(s) will become more apparent to those skilled in the art from the description below of the various features of the disclosed embodiments.

SUMMARY

I have now invented an automatic cart transport system which provides for easy attachment and detachment of a cart to an endless chain conveyor located in a factory working floor. This is important since it enhances ease of use of an automated system for movement of goods in a factory, such as between points where goods are worked on, or between a finished goods location and a shipping location. Moreover, the design provides for a quick disconnect mechanism for detachment of a cart from the automatic cart transport system which goods have arrived at a selected location.

An automatic conveyor system is provided for use in a factory having a working floor which is defined by its size and shape within the factory. The automatic conveyor system includes a track provided by a tubular member embedded in a substrate. The track has inner sidewalls and an upper slot. The track may be laid out along a plurality of straight sections connected by curved sections, and in such manner, the track may be laid out at least in part in a serpentine pattern in the substrate below the factory working floor. A conveyor chain is provided. The chain includes a plurality of first chain portions having a pair of vertical wheels and a plurality of second chain portions having at least one horizontal wheel. The first chain portions and second chain portions are sequentially pivotally connected to provide an endless flexible chain for movement within the track. The first chain portions each further include neck portions sized and shaped for upward extension through the upper slot of the track. Connection flanges extend transversely outward from the neck portions.

A coupling plate is provided, and is mounted to the connection flanges on a pair of adjacent first chain portions. The coupling plates each further include a connection shaft receiving aperture defined by interior sidewalk. A chain drive is provided, with a mechanism configured for moving the chain, such as by electrical power with a gear drive that acts on the chain.

The automatic conveyor system further includes a plurality of carts, each of which may be detachably connected to the chain. The carts have a load bearing surface which is supported by a plurality of wheels configured to support a loaded cart for rolling movement on the working floor in both a linear and in a curvilinear direction. In an embodiment, the cart may include a handle, so that the cart may be manually moved when detached from the chain. The cart is provided with a coupler, which may be a coupling pipe, sized and shaped to secure therein a chain connection shaft. In an embodiment, the chain connection shaft may further include a handle. In various embodiments, the chain connection shaft is sized and shaped for detachably securing the cart to the coupling plate, thus securing the cart to the chain, for automated movement on the factory working floor.

The automated cart transport system, which provides for quick and easy attachment to and detachment from a conveyor drive chain, needs no tools, or extra or loose parts, bolts, or other components for on-site use. Resultantly, the automatic cart transport system disclosed herein is easy to use, since all necessary components are already on board the cart, or provided with the conveyor chain, and are thus readily available.

BRIEF DESCRIPTION OF THE DRAWING

The present invention(s) are fully described herein by way of exemplary embodiments, using for illustration the accompanying drawing in which like reference numerals denote like elements in the various figures of the drawing, and in which.

Figure 1:
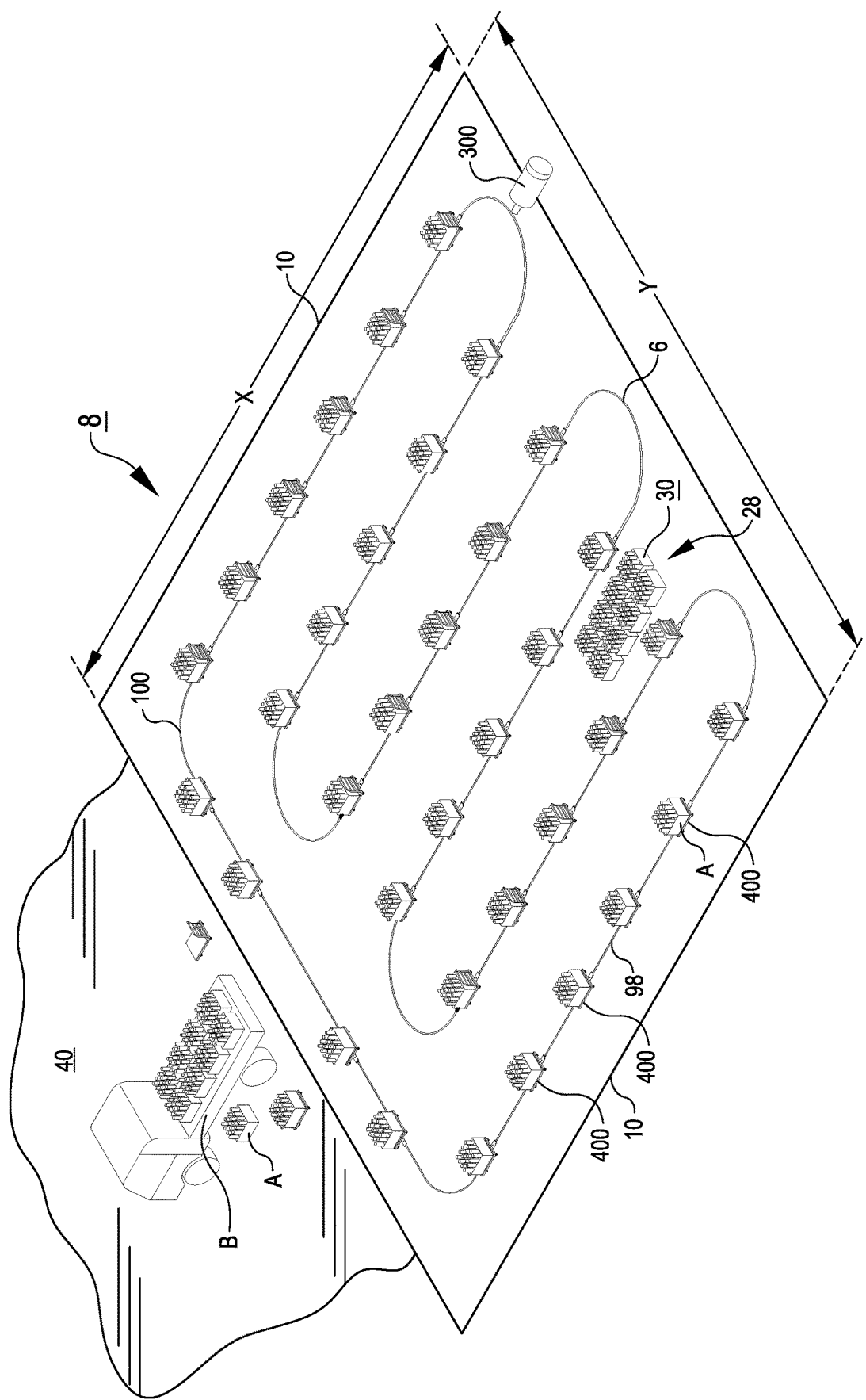
FIG. 1 is a perspective schematic view of an embodiment for an automatic cart transport system installed on the working floor of a factory, showing a set of straight sections and curved sections to provide a serpentine path for a track installed in the substrate below the factory working floor, and also showing the transfer of a set of pallets containing products such as plants between a point in the factor to a location adjacent a delivery truck being loaded.

The foregoing figures, being merely exemplary, contain various elements that may be present or omitted from a final configuration for an embodiment of an automatic cart transport system for use on the working floor of a factory. Other variations in quick disconnect components for detachable connection of carts on a factory floor to an endless flexible conveyor chain system may use other mechanical structures, mechanical arrangements, or size and shape of components, and yet employ the principles described herein and as generally depicted in the drawing figures provided, and as more specifically called out in the claims set forth below. Consequently, there is no intention to limit the claimed invention to suggested dimensional data, any of which is exemplary rather than mandatory. Thus, quick disconnect components for an automatic cart transport system may be provided which is sized up or down from any configurations depicted, without affecting the scope of the appended claims. An attempt has been made to draw the figures in a way that illustrates at least those elements that are significant for an understanding of exemplary quick disconnect apparatus for detachable carts in an automatic cart transport system.

It should be understood that various features may be utilized in accord with the teachings hereof, as may be useful in different embodiments as useful for various sizes and shapes of quick disconnect components for providing an automatic cart transport system, within the scope and coverage of the teachings herein as defined by the claims. Further, like features in various embodiments for an automated cart transport system may be described using like reference numerals, or other like references, without further mention thereof.

DETAILED DESCRIPTION

Attention is directed to FIG. 1, where an automatic conveyor system 6 is schematically depicted installed in factory 8 having a working floor 10. The working floor 10 may be defined by size and shape within the factory 1, such as by length X and width Y. The automatic conveyor system 6 includes a track 110 having a tubular member 112 embedded in a substrate 114 such as concrete which is used to provide the working floor 10. The track 110 has a roadway 115, inner sidewalls 116 and an upper slot 111. The track 110 is laid out along a plurality of straight sections 98 connected by curved sections 100. The track 110 may be laid out at least in part in a serpentine pattern in the substrate 114 below the working floor 10, and is configured for housing, for linear movement therein, an endless flexible chain 200, which moves along the track 110 as a circulation path. In an embodiment, a track 110 may be provided with a circular or elliptical shape path, or may be provided as a serpentine, zigzags configuration as shown in FIG. 1. In an embodiment, the track 110 may be provided at least in the straight sections 98, as a rectilinear or square substantially tubular member, wherein the inner sidewalls 116 are oriented as opposing vertical walls. In an embodiment, the rectilinear tubular member forming track 110 includes comprises first 118 and second 119 upper flange portions, and wherein the upper slot 111 is provided between end edges 118E and 119E of the first 118 and second 119 upper flange portions.

Figure 2:
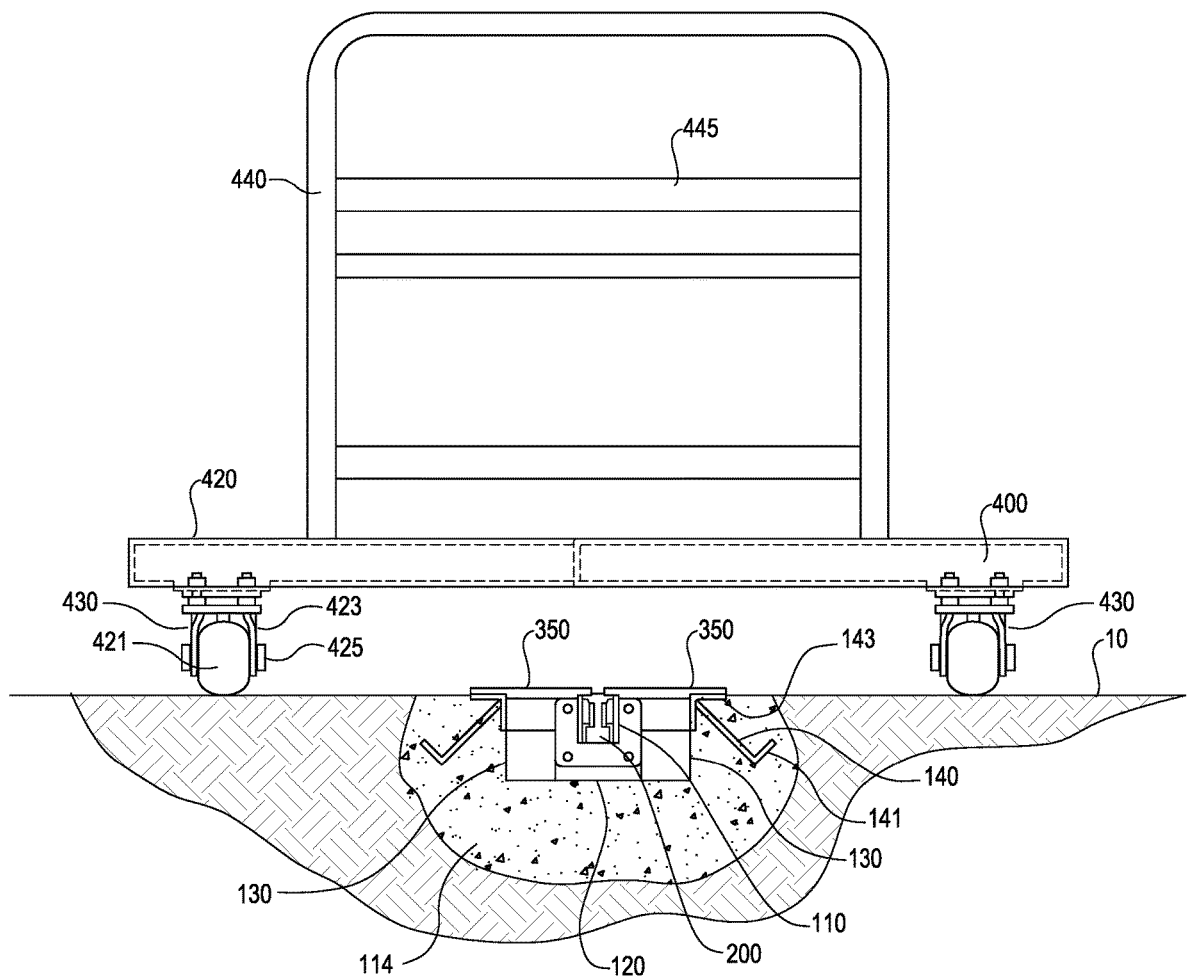
FIG. 2 is an elevation view, showing one of the carts having a load bearing surface, handle extending upward, and a plurality of wheels for movement on a working floor of the factory, with the cart positioned in a location centered above the track, and also showing how the track is embedded in the substrate, such as concrete, which forms the working floor in a factory.
Figure 3:
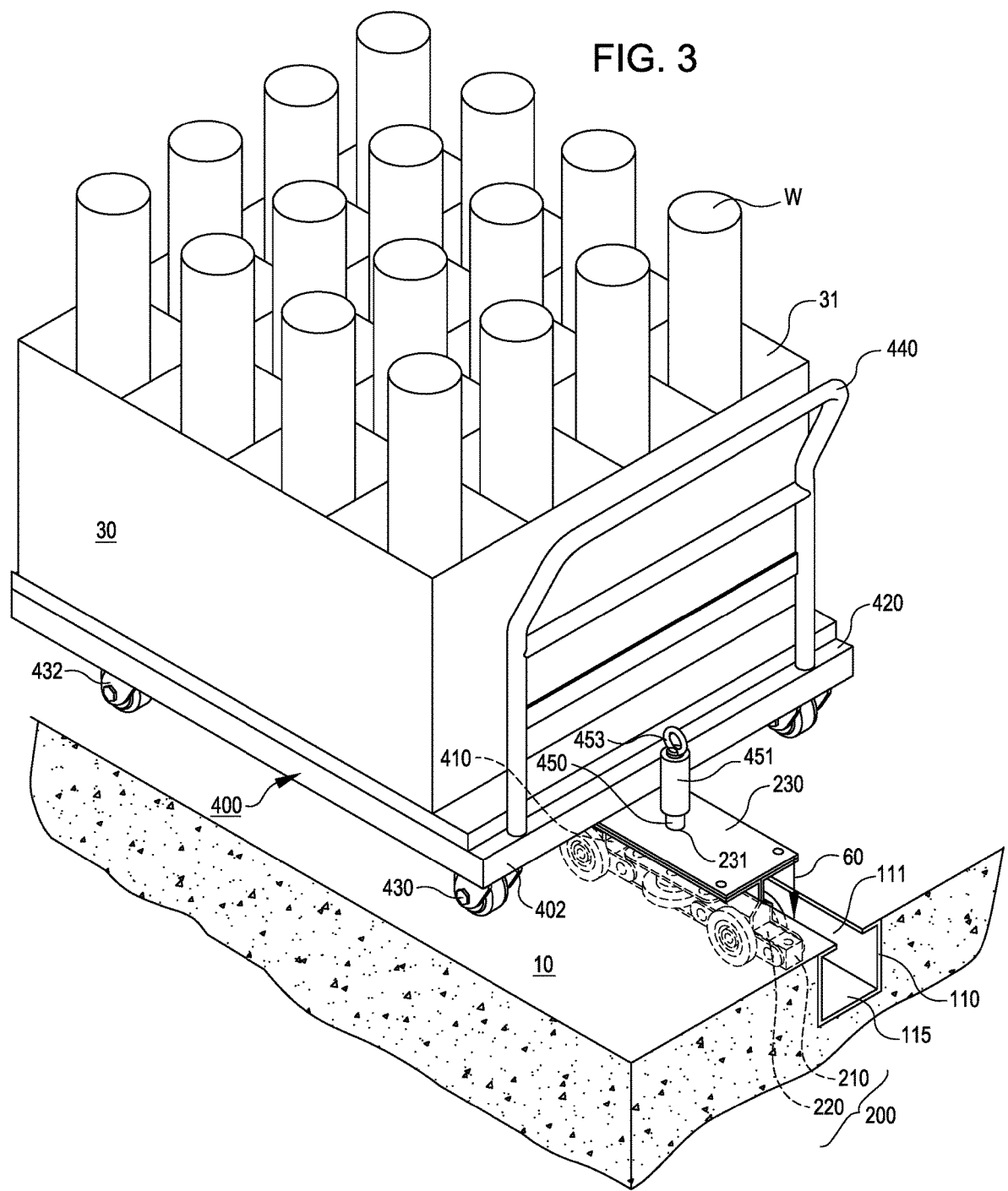
FIG. 3 is a perspective view of a cart engaged for movement with conveyor chain, showing a carts having a load bearing surface on which articles for transport have been placed, and showing the use of a coupling plate mounted to connection flanges on a pair of adjacent first chain portions, with a chain connection shaft joining the cart to the coupling plate.
Figure 4:
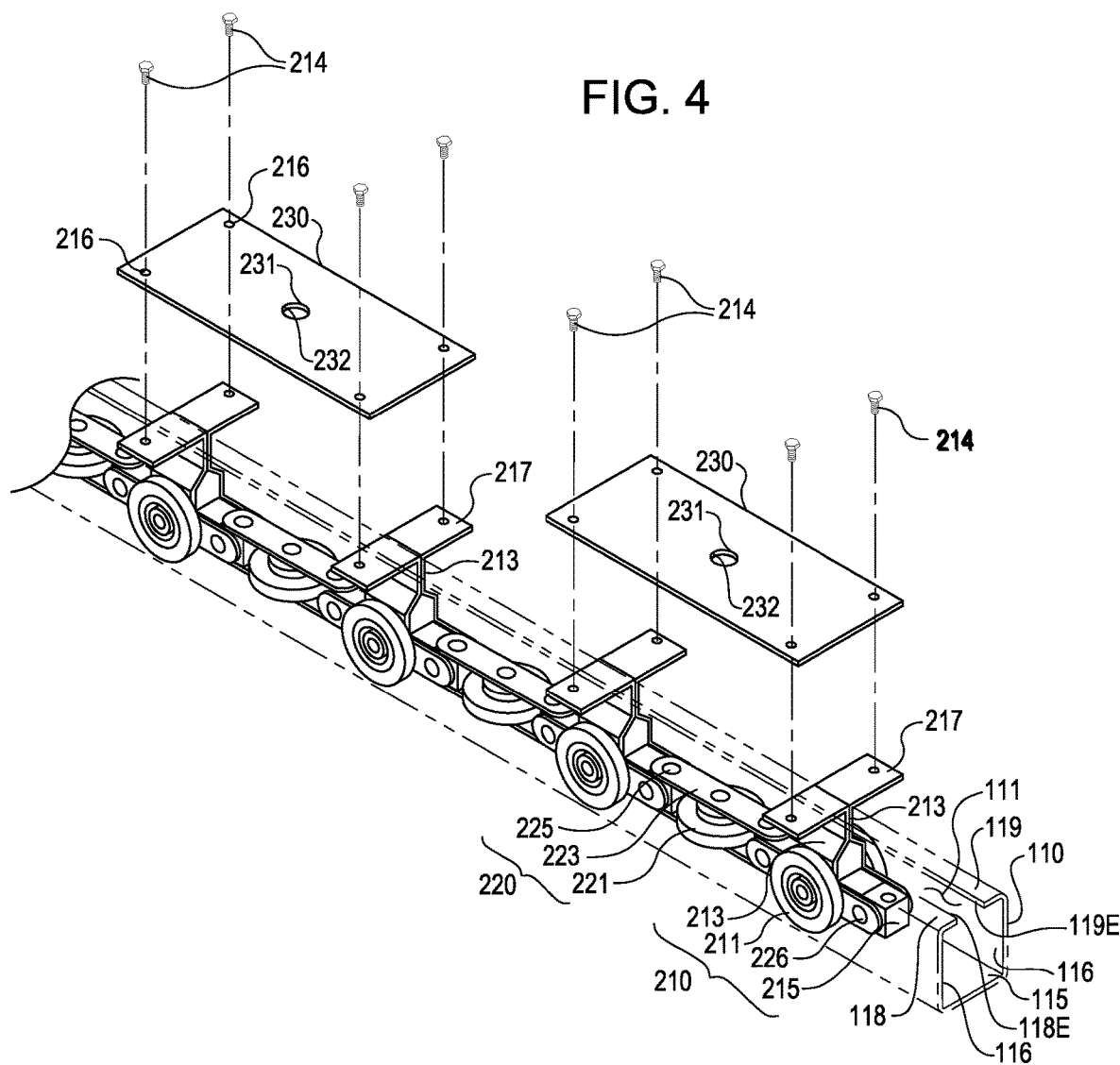
FIG. 4 is a partial perspective view of portions of a chain used to provide an endless flexible conveyor chain, where the chain includes a plurality of first chain portions having a pair of vertical wheels and a plurality of second chain portions having at least one horizontal wheel, wherein first chain portions and second chain portions are sequentially adjustably connected forming an endless flexible chain for movement within the track, with the first chain portions each further having neck portions sized and shaped for upward extension through an upper slot of a track, and with connection flanges extending transversely outward from the neck portions, and coupling plates mounted to connection flanges on a pair of adjacent first chain portions, and where the coupling plates each further include a connection shaft receiving aperture defined by interior sidewalls.
Figure 5:
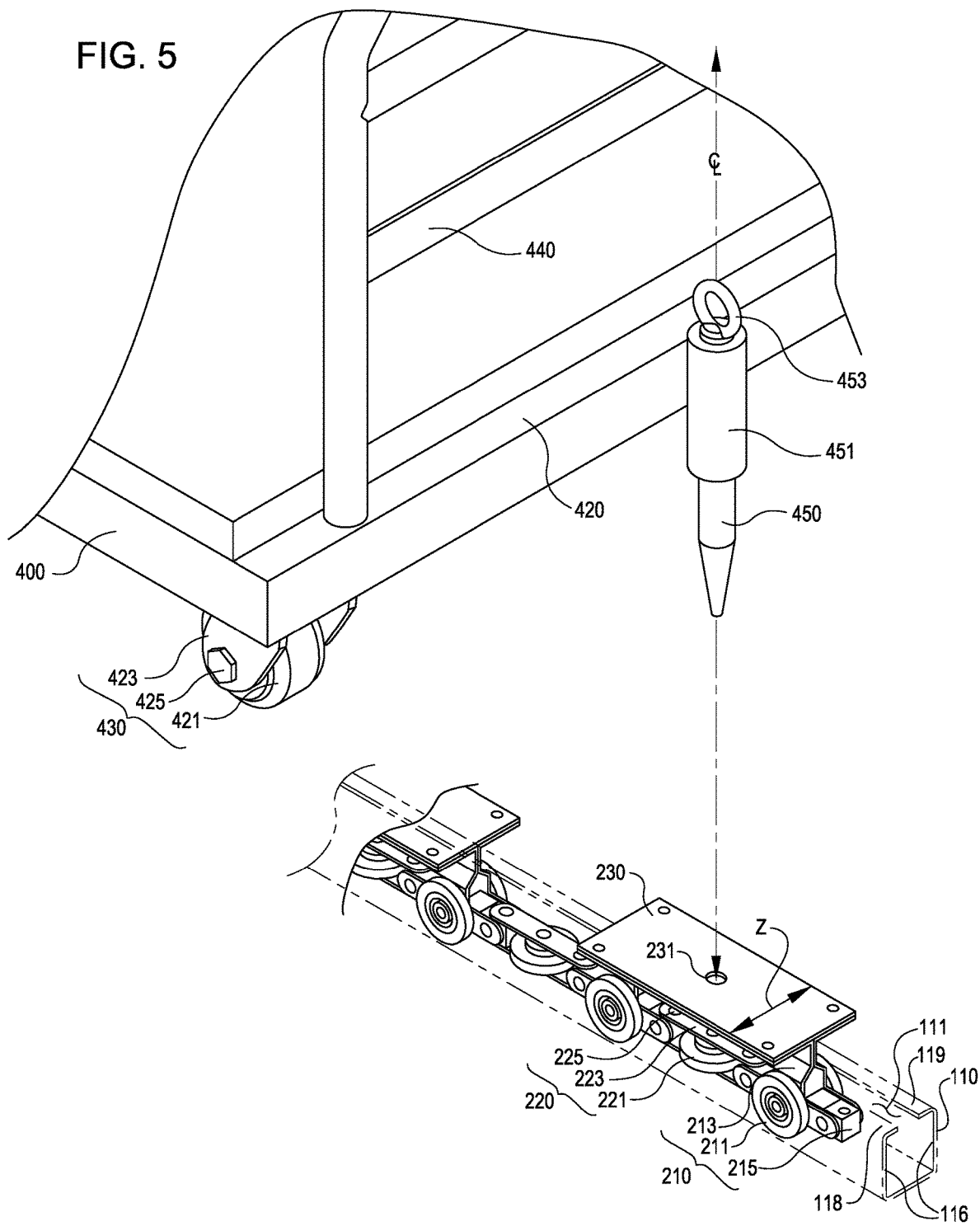
FIG. 5 is a partial exploded perspective view, further detailing components shown in FIGS. 3 and 4 above, now showing how the cart is joined to the conveyor chain using coupling plates on the chain which are joined via a connection shaft, what is fitted through a coupler mounted on the cart, and thus into an operating, cart moving position, ready for movement of a cart using the automatic cart transport system.

The endless flexible chain 200 includes a plurality of first chain portions 210 having a pair of vertical rollers 211 which ride on roadway 115, and a plurality of second chain portions 220 having at least one horizontal roller 221. The first chain portions 210 and second chain portions 220 are sequentially adjustably connected vertical pivot pins 225 and horizontal pivot pins 226 to form an endless flexible chain 200 sized and configured for linear movement within the track 110. The track 110 accommodates the endless flexible chain 200 therein, as shown in FIGS. 2 and 3, and interacts with the vertical rollers 211 and the horizontal rollers 221 of the chain 200. To this end, while providing adequate clearance for rotation of the vertical rollers 211 and the horizontal rollers 221, the width of the track body 110 is formed to correspond roughly to the diameter of the horizontal roller 221, and the height of the track 110 is provided corresponding to the diameter of the vertical roller 211.

The first chain portions 210 each further include neck portions 213 sized and shaped for upward extension through the upper slot 111 of the track 110. Connection flanges 217 extend transversely outward from the neck portions 213.

Coupling plates 230 are provided, and are mounted, such as by using fasteners 214 through apertures 216 in coupling plates 230, to connection flanges 213 on pairs of adjacent first chain portions 210. The coupling plates 230 each further include a connection shaft receiving aperture 231 defined by interior sidewalls 232. The coupling plates 230 are provided in a width Z that fits between inner sidewalls 115 of track 110, when situated in track 110 as noted by reference arrow 60 in FIG. 3.

A chain drive mechanism 300 is provided, and it is configured for moving the endless flexible chain 200 using a conventional mechanism such as a geared chain drive (not shown), which transfers sufficient a driving force to the endless flexible chain 200 to move it along through the track 110. In an embodiment, a chain drive mechanism 300 transmits the rotational force of a driving motor to the endless flexible chain 200 as indicated in FIG. 1.

As additionally seen in FIG. 2, reinforcing plates 350 may be provided, located above the first 118 and second 119 upper flange portions, and mounted horizontally in a substantially flush with the working floor 10. The reinforcing plates 350 are situated to protect the first 118 and second 119 upper flange portions against wear due to passage of the neck portions 213 longitudinally through the upper slot 111, as the endless flexible chain 200 moves along pulling a cart 400.

In order for the automatic conveyor system 6 to move goods in a factory 8, a plurality of carts 400 are provided. Carts 400 each have a load hearing surface 420, on which goods, such as packing crates 30 with goods therein, can be placed. As an example, in FIG. 3, cart 400 is shown with packing crate 30 on the load bearing surface 420. Packing crates 30 may include partitions 31 which are useful for separating workpieces W, as may be provided in a factory 8. The cart 400 may be provided in a configuration wherein the load hearing surface 420 is supported by a plurality of wheels, such as front wheels 430 and rear wheels 432, which are configured to support the cart 400 for rolling movement on the working floor 10 in both a linear direction (i.e. along straight track sections 98) and in a curvilinear direction (i.e. along curved track sections 100). In an embodiment, the front wheels 430 may include a swiveling front wheel assembly 423, a front wheel axle 425, and a load bearing front wheel 421. In an embodiment, rear wheels 432 may be provided in a swiveling configuration similar or identical to the configuration used for front wheels 430. In various embodiments, the cart 400 may further include a handle 440, which may be attached to the front 402 of the cart 400. In an embodiment, the handle 440 may include cross-braces or stiffeners 445.

In various embodiments, the cart 400 may be provided with a coupler, for example in the form of a coupling pipe 451, sized and shaped to secure therein a chain connection shaft 450. In an embodiment, the chain connection shaft 450 may further include a handle 453, for use in manually inserting the chain connection shaft 450 into a connection shaft receiving aperture 231 in selected coupling plate 230, or in removing the chain connection shaft 450 from a selected connection shaft receiving aperture 231. In any event, the chain connection shaft 450 is sized and shaped for detachably securing the cart 400 to the coupling plate 230, via secure coupling engagement with the chain connection shaft receiving aperture 231 in the coupling plate 230. The operator inserts or removes the chain connection shaft 450 of the cart 400 through the upper slot 111.

As seen in FIG. 2, the track 110 may be located in a substrate 500, i.e. buried below factory working floor 10, such as in a track protector 120 that is recessed and secured below floor 10 at a predetermined depth. In such a configuration, the track 110 is located in the track protector 120. In such a configuration, the reinforcing flanges 350, as described above, are located at the top, laterally straddling the longitudinally extending upper slot 111. Reinforcing flanges 350 may extend outward beyond track protector 120, with ears 143 as shown in FIG. 2.

The reinforcing flanges 350 protects the upper slot 111, to help prevent damage the endless flexible chain 200 and the track 110 while the front wheels 430 and rear wheels 432 of cart 400 are moved.

The track protector 120 may have a bottom 510, and track side frames 130. Stiffeners 140 may be used to anchor the track protector 120 in the substrate 500, such as concrete used in construction of factory working floor 10. Typically, the cart 400 is moved along the track 110 with a heavy article loaded on the upper surface. Accordingly, the area of floor 10 adjacent track 110 may settle due to load of the cart 400 and the articles thereon. The side stiffeners 140 which are inserted between the track protector 120 side frames 130 may help prevent such settling. The track protector 120 may be formed to fit the body of track 110 having various shapes.

In the automatic cart conveyor system 6 as described herein, the cart automatically moves across the working floor 10 as urged along by way of the traction force of the endless flexible chain 200. Accordingly, there is an advantage of using the automatic cart conveyor system 6, since the labor force can be reduced. As seen in FIG. 1, for example, the time required for moving goods from the manufacturing point or goods storage area 28, and moving multiple packing crates to the shipping point, such as the truck B in a loading dock area of parking lot 40, is dramatically reduced, since the worker does not have to directly and manually drag the cart and move the finished goods W. When factory 8 is a plant cultivation factory, than a cultivation box A may be loaded on the truck B by separating the cultivation box A from the cart 400, and moving the cultivation box A to the truck B.

In an embodiment, the cart 400 may be loaded with a cultivation box A for mushroom cultivation as shown in FIG. 3. In this embodiment, the cultivation box A is formed to have a plurality of compartments by the partition 31, and each compartment may accommodate a workpiece tree W for mushroom cultivation. In this manner, a cart 400 in which the cultivation box A is loaded is moved along the track 110 and can be used for mushroom cultivation. As a result, plants including mushrooms can be moved along the working floor 10 while loaded on cart 400, and cultivated while being moved by the automatic conveyor system 6. In addition, those plants which have completed cultivation can be moved from being loaded on the cart 400 directly to vehicle such as truck B, thereby reducing the labor of workers required for plant cultivation.

As mentioned above, the first chain portion 210 provides a vertical roller unit that includes a pair of vertical rollers 211, secured in a vertical roller frame 215. Connection joints which may be in the form of vertical pivot pins 225 and horizontal pivot pins 226 are provided at the front and rear of vertical roller frame 215 to connect the vertical roller frame 215 with adjacent horizontal roller frames 223. The horizontal roller frame 223 rotationally supports the horizontal roller 221. In operation, the vertical rollers 211 contact the bottom 115 of track 110, and the horizontal rollers 221 contact inner sidewalls 116. Due to the coupling structure of the first chain portion 210 which provides the vertical rollers 211 and the second chain portion 220, which provides the horizontal rollers 221, the chain 200 can be smoothly moved even in the curved portions of curved track 110.

The description provided herein also describes a process for efficiently using an automatic conveyor system 6, as described herein and with a configuration as shown in FIGS. 1 through 5. As shown herein a cart 400 may be detachably affixed to an moving flexible endless chain 200 which automatically moves goods W around a factory 8. As noted above, the automatic cart transport system is useful in mushroom cultivation, where a cultivation box A may be loaded on carts 400, and mushrooms may be cultivated while attached to the moving endless chain 200. Then, once cart 400 reaches a point adjacent a loading a loading dock, cart 400 may be separated from chain 200, and the cultivation box A can be moved to truck B, which may be loaded with a plurality of cultivation boxes A. The empty cart 400 may be recoupled to the endless flexible chain 200, and moved back to a storage area 28. Through this process, the cart 400 circulates along the path of the track 110 and automatically transfers the cultivation box A between the loading dock area and the article storage area 28.

In the examples just provided above, it has been described that the cart moves between a goods drop-off and the goods loading dock at a parking lot, where a cultivation box is unloaded from cart 400 and loaded on truck B. However, this is just, an example, and the automatic cart transport system described herein can be used for various purposes in many places, such as in factories for manufacturing products, or in other agricultural processing or packaging operations, and in parcel sorting situations. In any of such situations, the automatic transport of a cart 400, by way of an endless flexible conveyor chain in the floor of a factory, may provide labor and other cost savings. Accordingly, there is an advantage of reducing the labor force requirements, and time requirements, for workers who are moving goods of various kinds.

The embodiments of the automatic cart transport system described above are only exemplary, and those of ordinary skill in the technical field to which the present invention belongs are aware that various modifications and other equivalent embodiments are possible. Therefore, it will be appreciated that the present invention is not limited to the form mentioned in the detailed description above. Therefore, the true technical protection scope of the present invention should be determined only by the appended claims, and their legal equivalents. Thus, the present invention(s) described herein are to be understood as including the spirit of the present invention as defined by the appended claims and all modifications, equivalents and substitutes within the scope thereof.

It is to be appreciated that the quick connect and disconnect apparatus for attaching a cart to an endless conveyor chain system as described herein is an appreciable improvement in the art of moving goods in factories. The novel design for a quick attachment and disconnect mechanism addresses the problem of how to conveniently attach, detach, and store a plurality of carts used in a factory setting for moving goods.

The embodiments have been thoroughly described to enable those of ordinary skill in the art to make and use the invention. Although only a few exemplary embodiments have been described in detail, various details are sufficiently set forth in the drawings and in the specification provided herein to enable one of ordinary skill in the art to make and use the invention(s), which need not be further described by additional writing in this detailed description. It will be readily apparent to those skilled in the art that the automatic cart transfer system may be modified from those embodiments provided herein, without materially departing from the novel teachings and advantages provided. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

The invention claimed is:

1. An automatic conveyor system, the automatic conveyor system for use in a factory having a working floor, the working floor having a defined by size and shape within the factory, the automatic conveyor system comprising:
   a track, the track comprising a tubular member embedded in a substrate, the track having inner sidewalls and an upper slot, the track laid out along a plurality of straight sections connected by curved sections, the track laid out at least in part in a serpentine pattern in said substrate below the working floor;
   a chain, the chain comprising a plurality of first chain portions having a pair of vertical wheels and a plurality of second chain portions having at least one horizontal wheel, wherein first chain portions and second chain portions are sequentially adjustably connected forming an endless flexible chain for movement within the track, the first chain portions each further comprising neck portions sized and shaped for upward extension through the upper slot of the track, and connection flanges extending transversely outward from the neck portions;

a coupling plate, the coupling plate mounted to connection flanges on a pair of adjacent first chain portions, the coupling plate each further comprising a connection shaft receiving aperture defined by interior sidewalls; and a chain drive mechanism configured for moving the chain.

2. The automatic conveyor system as set forth in claim 1, wherein the track comprises a rectilinear tubular member, wherein, the inner sidewalls provide opposing vertical walls.

3. The automatic conveyor system as set forth in claim 2, wherein the rectilinear tubular member comprises first and second upper flange portions, and wherein the upper slot in the square tubular member is provided between end edges of the first and second upper flange portions.

4. The automatic conveyor system as set forth in claim 3, further comprising upper reinforcing plates, the upper reinforcing plates located above the first and second upper flange portions, and substantially flush with the working floor, and located to protect the first and second upper flange portions against wear due to passage of the neck portions longitudinally through the upper slot.

5. The automatic conveyor system as set forth in any one of claims 1 through 4, further comprising a cart; the cart having a load bearing surface, the load bearing surface supported by a plurality of wheels configured to support the cart for rolling movement on the working floor in a linear and in a curvilinear direction, the cart further comprising a coupling pipe, the coupling pipe sized and shaped to secure therein a chain connection shaft.

6. The automatic conveyor system as set forth in claim 5, wherein the cart further comprises a handle.

7. The automatic conveyor system as set forth in claim 5, wherein the chain connection shaft is sized and shaped for detachably securing the cart to the coupling plate, via secure coupling engagement with the chain connection shaft receiving aperture in the coupling plate.

8. The automatic conveyor system as set forth in claim 7, wherein the chain connection shaft further comprises a handle.

* * * * *